(12) United States Patent
Poddar et al.

(10) Patent No.: US 11,288,525 B2
(45) Date of Patent: Mar. 29, 2022

(54) OBJECT DETECTION FOR DISTORTED IMAGES

(71) Applicant: TEXAS INSTRUMENTS INCORPORATED, Dallas, TX (US)

(72) Inventors: Deepak Poddar, Bengaluru (IN); Soyeb Nagori, Bengaluru (IN); Manu Mathew, Bengaluru (IN); Debapriya Maji, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 100 days.

(21) Appl. No.: 16/588,157

(22) Filed: Sep. 30, 2019

(65) Prior Publication Data
US 2020/0134331 A1 Apr. 30, 2020

(30) Foreign Application Priority Data
Oct. 31, 2018 (IN) .............................. 201841041179

(51) Int. Cl.
*G06K 9/00* (2006.01)
*G06T 11/20* (2006.01)
*G06T 7/70* (2017.01)

(52) U.S. Cl.
CPC ............ *G06K 9/00812* (2013.01); *G06T 7/70* (2017.01); *G06T 11/203* (2013.01); *G06T 2207/20081* (2013.01); *G06T 2207/30264* (2013.01)

(58) Field of Classification Search
CPC ..... G06K 9/00812; G06T 7/70; G06T 11/203; G06T 2207/20081; G06T 2207/30264; G06T 5/006; G06T 11/00
See application file for complete search history.

(56) References Cited

U.S. PATENT DOCUMENTS

| 10,242,575 B1 * | 3/2019 | Chan ...................... G08G 1/148 |
| 2013/0265429 A1 * | 10/2013 | Yoon ........................ G08G 1/14 348/148 |
| 2015/0193916 A1 * | 7/2015 | Jin ............................ B60R 1/00 345/634 |

* cited by examiner

*Primary Examiner* — Siamak Harandi
(74) *Attorney, Agent, or Firm* — Ebby Abraham; Charles A. Brill; Frank D. Cimino

(57) ABSTRACT

Techniques including receiving a distorted image from a camera disposed about a vehicle, detecting, in the distorted image, corner points associated with a target object, mapping the corner points to a distortion corrected domain based on one or more camera parameters, mapping the corner points and lines between the corner points back to a distorted domain based on the camera parameters, interpolating one or more intermediate points to generate lines between the corner points in the distortion corrected domain mapping the corner points and the lines between the corner points back to a distorted domain based on the camera parameters, and adjusting a direction of travel of the vehicle based on the located target object.

20 Claims, 7 Drawing Sheets

OBJECT DETECTION FOR DISTORTED IMAGES

CROSS-REFERENCE TO RELATED APPLICATIONS

This application claims priority to Indian Provisional Application No. 201841041179, filed Oct. 31, 2018, which is hereby incorporated by reference.

BACKGROUND

Increasingly, vehicles, such as cars, robots, aircraft, etc., are becoming increasingly automated and able to perform various activities on their own without being directly controlled by a person. As an example, one important activity that may be performed by an autonomous vehicle, such as an autonomous car, is automatically parking the car in a parking space.

Various sensors may be disposed on a vehicle to help enable autonomous operation. These sensors may include cameras sensitive to a range of electromagnetic frequencies, including visible light, near and far infrared, etc. These cameras may sometimes utilize lenses with some amount of intentional distortion, such as wide-angle or fisheye lenses, which can allow for a wider field of view as compared to other lenses with less distortion.

SUMMARY

This disclosure relates to a method, the method including receiving a distorted image from a camera disposed about a vehicle, detecting, in the distorted image, corner points associated with a target object, mapping the corner points to a distortion corrected domain based on one or more camera parameters, interpolating one or more intermediate points to generate lines between the corner points in the distortion corrected domain, mapping the corner points and the lines between the corner points back to a distorted domain based on the camera parameters, locating the target object in the distorted image based on pixels within the lines, and adjusting a direction of travel of the vehicle based on the located target object.

Another aspect of the present disclosure relates to a non-transitory program storage device including instructions stored thereon to cause one or more processors to receive a distorted image, detect, in the distorted image, corner points associated with a parking spot, map the corner points to a distortion corrected domain based on one or more camera parameters, interpolate one or more intermediate points to generate lines between the corner points in the distortion corrected domain, map the corner points and lines between the corner points back to a distorted domain based on the camera parameters, locate the target object in the distorted image based on the pixels within the lines, and output one or more instructions for adjusting a direction of travel based on the located target object.

Another aspect of the present disclosure relates to a vehicle capable of detecting a parking spot, the vehicle including one or more cameras disposed about the vehicle, a memory, and one or more processors operatively coupled to the memory, and the one or more cameras, wherein the one or more processors are configured to execute non-transitory instructions causing the one or more processors to receive a distorted image from the one or more cameras, detect, in the distorted image, corner points associated with a parking spot, map the corner points to a distortion corrected domain based on a camera parameter, map the corner points to a distortion corrected domain based on one or more camera parameters, interpolate one or more intermediate points to generate lines between the corner points in the distortion corrected domain, map the corner points and lines between the corner points back to a distorted domain based on the camera parameters, locate the target object in the distorted image based on the pixels within the lines, and output one or more instructions for adjusting a direction of travel based on the located target object.

It may be understood that while techniques herein are discussed in the context of visible light cameras, nothing in this disclosure is meant to limit these techniques to such sensors. Rather, the techniques discussed herein are readily applicable across a broad range of sensor devices, including, non-visible light or electromagnetic sensors, including infrared, near infrared, or cameras capable of capturing images across a wide range of electromagnetic frequencies.

BRIEF DESCRIPTION OF THE DRAWINGS

For a detailed description of various examples, reference will now be made to the accompanying drawings in which.

DETAILED DESCRIPTION

Some object detection routines are based on relatively distortion-free images, rather than, for example, fisheye distorted images. Generally, parking spots are rectilinear in shape, but seen through a fisheye distortion, rectilinear shapes may appear to be curved or rounded. A mapping or correction algorithm may be first applied to remove the distortion prior to object detection, but this two-step process can result in reduced resolution and/or increased computing resource utilization, such as increased memory access traffic. What is desirable is a technique for parking spot detection directly on the distorted images.

Machine learning algorithms may be used to identify and classify objects in an image. Machine learning (ML) algorithms, such as a ML object detector, generally have two phases, a training phase and an operating phase. In the training phase, a large number, in the order of hundreds, if not tens or hundreds of thousands of labeled images are used to train the ML object detector to recognize a particular object. Once labeled, the image may be used as a part of a training process for the ML object detector. The labels of these labeled images are considered a ground truth as for objects in the respective image that the ML object detector is being trained on. As the ground truth for an image defines the facts for the image (e.g., definitively identifying where in the image the parking spot is), objects in these labeled images are often identified and labeled by a person. As labeling is human performed, generating such labeled images is labor intensive. In certain cases, a ML object detector may include a one or more levels of recognizers associated with various weights, which can detect various aspects of a target object. Once presented with a training image, these recognizers can be used to generate a prediction as to whether the target object is present and/or the location of the target object. This prediction is then compared to the label of the training image, and a difference between the prediction and ground truth, as defined by the label, is determined by a loss criteria or function. The results of this loss criteria may then be back propagated though the levels of recognizers to adjust the various weights associated with the recognizers. This process may then be repeated, for example over many hours, days, or weeks, for the training images. In certain cases, training may be concluded based on one or more criteria, such as accuracy of the ML object detector over a validation set of images.

Figure 1:
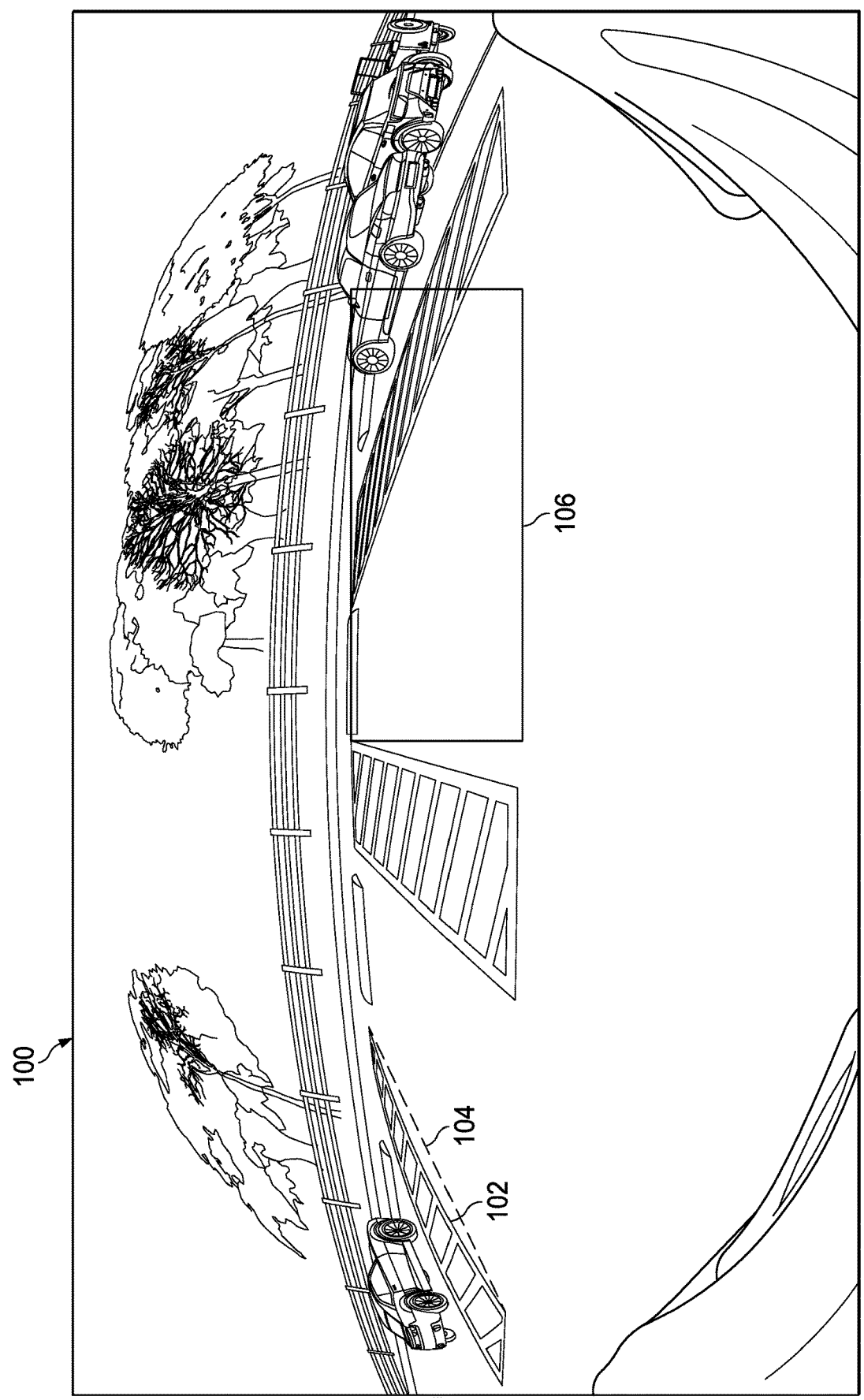
FIG. 1 is a distorted image, in accordance with aspects of the present disclosure.

Generally, cameras used in vehicles can include lenses which may produce distorted images, such as fisheye or wide-angle lenses. Generally, these lenses offer wider views as compared to other lenses and using these lenses can reduce the number of cameras needed to generate a particular view. Of note, while described in conjunction with fisheye or wide-angle lenses, it may be understood that techniques addressed in this disclosure may be adapted for other types of lenses which may induce distortion, for example, magnifying, or barrel distortion lenses. As an example, a vehicle may use a single 180 degree fisheye lens to cover an entire side of the vehicle. Images generated using fisheye lenses further complicate labelling. For example, as shown in FIG. 1 illustrating a distorted image 100, a straight parking line 102 appears as a curved line in fisheye images, as compared to reference line 104. Hand-tracing or outlining such curved lines greatly magnifies the difficulty for labelling. It is possible to correct for the fisheye lens distortion prior to labelling, but such corrections can introduce artifacts and reduce an effective resolution of the images. Similarly, in the operating phase, conventional object detection, such as single shot detection (SSD) or you only look once (YOLO) detection, generally operate using rectangular bounding or anchor boxes, such as bounding box 106. However, in the fisheye domain, these rectangular boxes generally are not precise enough to exactly determine boundaries of a parking spot. While described in the context of a parking spot, it may be understood that techniques discussed herein may be applied to detection of other rectilinear target objects in distorted images, such as signs, buildings, markings, etc.

Figure 2:
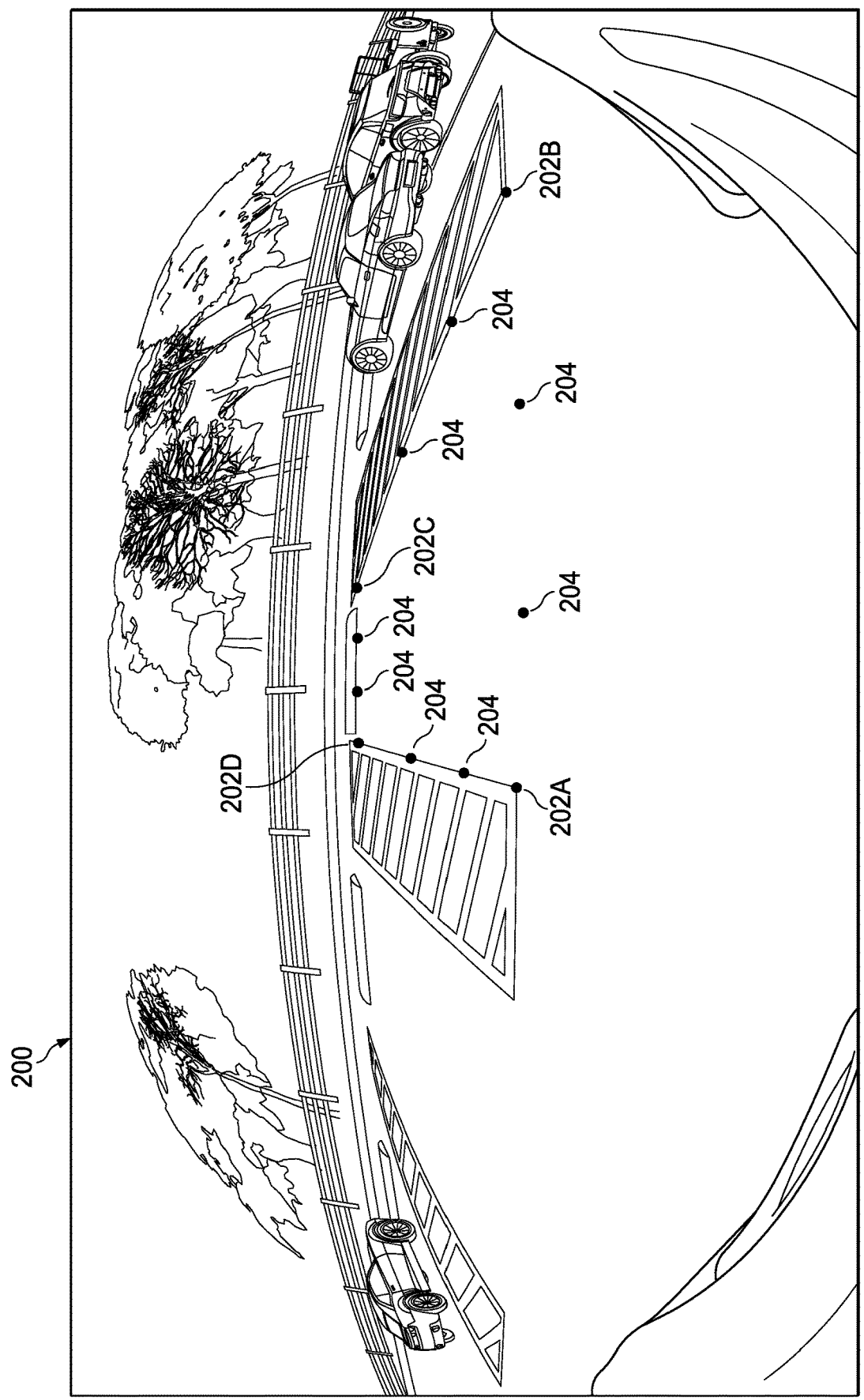
FIG. 2 illustrates corner detection for a distorted image, in accordance with aspects of the present disclosure.

FIG. 2 illustrates corner detection for a distorted image 200, in accordance with aspects of the present disclosure. Rather than annotating an image of a parking spot by tracing or outlining borders of the parking spot, labeling may be performed for distorted images, in the distorted image domain, by annotating four corner points 202A-202D of a parking spot. By labeling just the four corner points 202A-202D of a parking space, the amount of work for a trainer may be reduced, as compared to tracing the sides of the parking space. In certain cases, corner points 202A-202D may be annotated in a consistent order consistent with an entry point of a parking spot. For example, labeling may be performed such that the first corner point represents the left corner of the parking spot from the point of view of a vehicle positioned to enter the parking spot. Other corner points may be labeled in an anti-clockwise fashion. It may be understood that while other corner points are labelled in an anti-clockwise fashion in this embodiment, the exact order in which the labels are identified can vary in other embodiments. For example, corner points may be labeled in a clockwise fashion, or star pattern. Consistency in the ordering and identifying which points define entry points to a parking spot as between images helps increase learning efficacy. In FIG. 2, for example, the corner point 202A may be labeled first, followed by corner points 202B, 202C, and 202D, in order. The image may be labelled with at least the four corner points 202A-202D locations.

In certain cases, additional intermediate points may also be annotated. These intermediate points may be placed at regular intervals along the boundary of the parking spot. An equal number of intermediate points may be used for each side. For example, a trainer may annotate two points along each side of the parking spot between each pair of corner points, such as shown with respect to intermediate points 204.

In certain cases, a pixel mask for pixel wise detection may be generated based on the identified corner points 202A-202D. This pixel mask identifies, on a pixel-by-pixel basis, which pixels correlate with a location inside the parking spot, and which pixels do not. The pixel mask may be generated, in certain cases, after the four corner points 202A-202D of the parking spot have been annotated. These four corner points 202A-202D may be converted into a distortion corrected image domain, for example based upon a set of intrinsic properties of the lens. Generally, the set of intrinsic properties of the lens describe the distortion produced by the lens. The intrinsic properties can be used to correct the distorted image by mapping the four corner points 202A-202D from the distorted image domain to the corrected image domain, and back.

Figure 3:
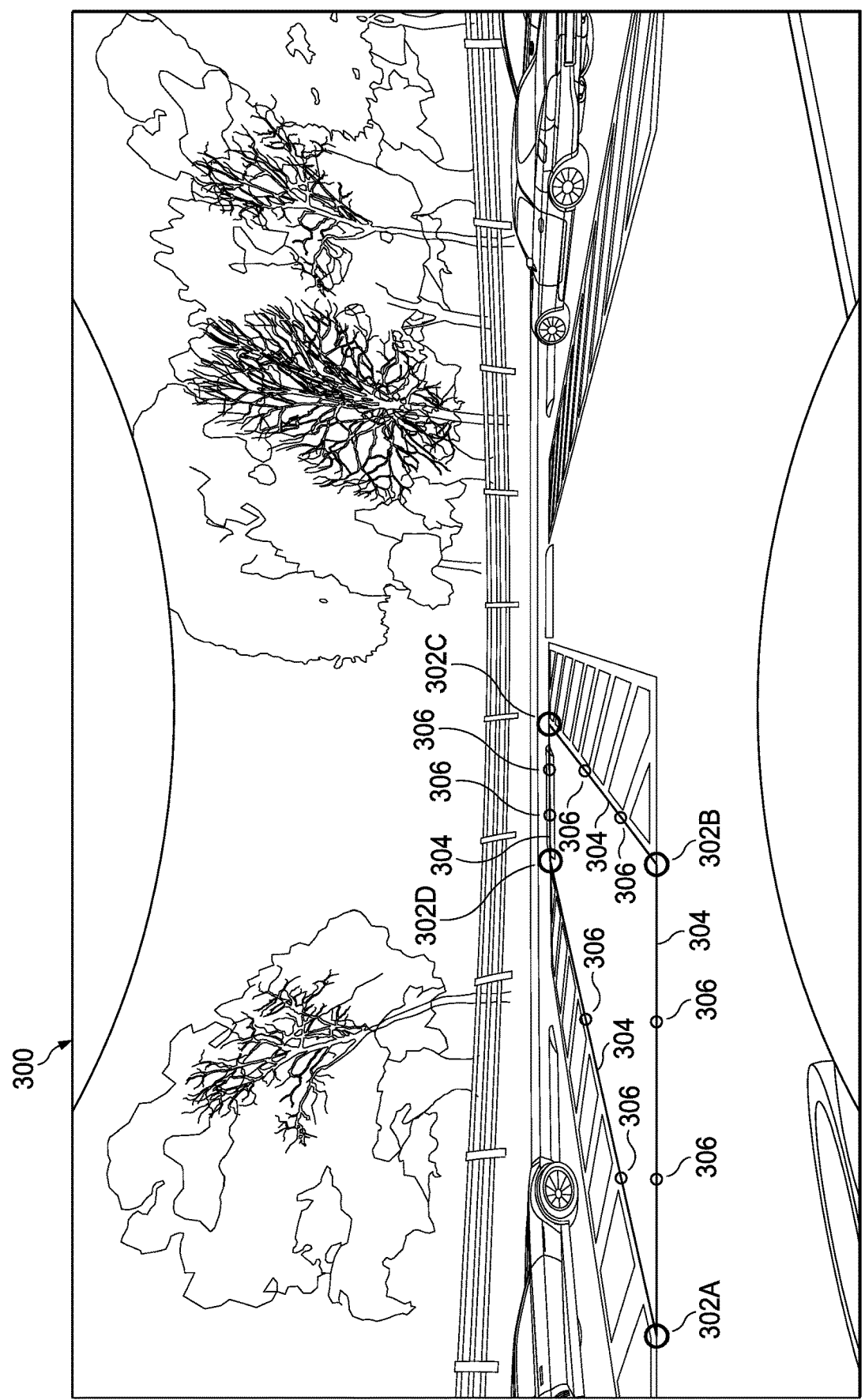
FIG. 3 illustrates generating a pixel mask, in accordance with aspects of the present disclosure.

FIG. 3 is the distorted image 200 of FIG. 2 converted to the corrected image domain 300, in accordance with aspects of the present disclosure. For clarity image 300 has been converted to the corrected image domain. In certain cases, the four corner points 302A-302D may be converted to the corrected image domain without converting the entire image. After converting the four corner points 202A-202D of FIG. 2 into the corrected image domain corner points 302A-302D, lines 304 may be drawn linking the four corner points 302A-302D. By converting the image and corner points into the corrected image domain, lines may be drawn based on just the corner points without having to take into account distortion effects from the lens. Where intermediate points 306 are available, the lines 304 may be drawn based on the corner points 302A-302D and the intermediate points 306 (corresponding to intermediate points 204 of FIG. 2). The four corner points 302A-302D, and intermediate points 306, if any, may then be converted back into the distorted image domain. This conversion back into the distorted image domain can cancel artifacts that may have been introduced by the conversion to the corrected image domain. The image may be labelled with the four corner points 302A-302D locations.

Figure 4:
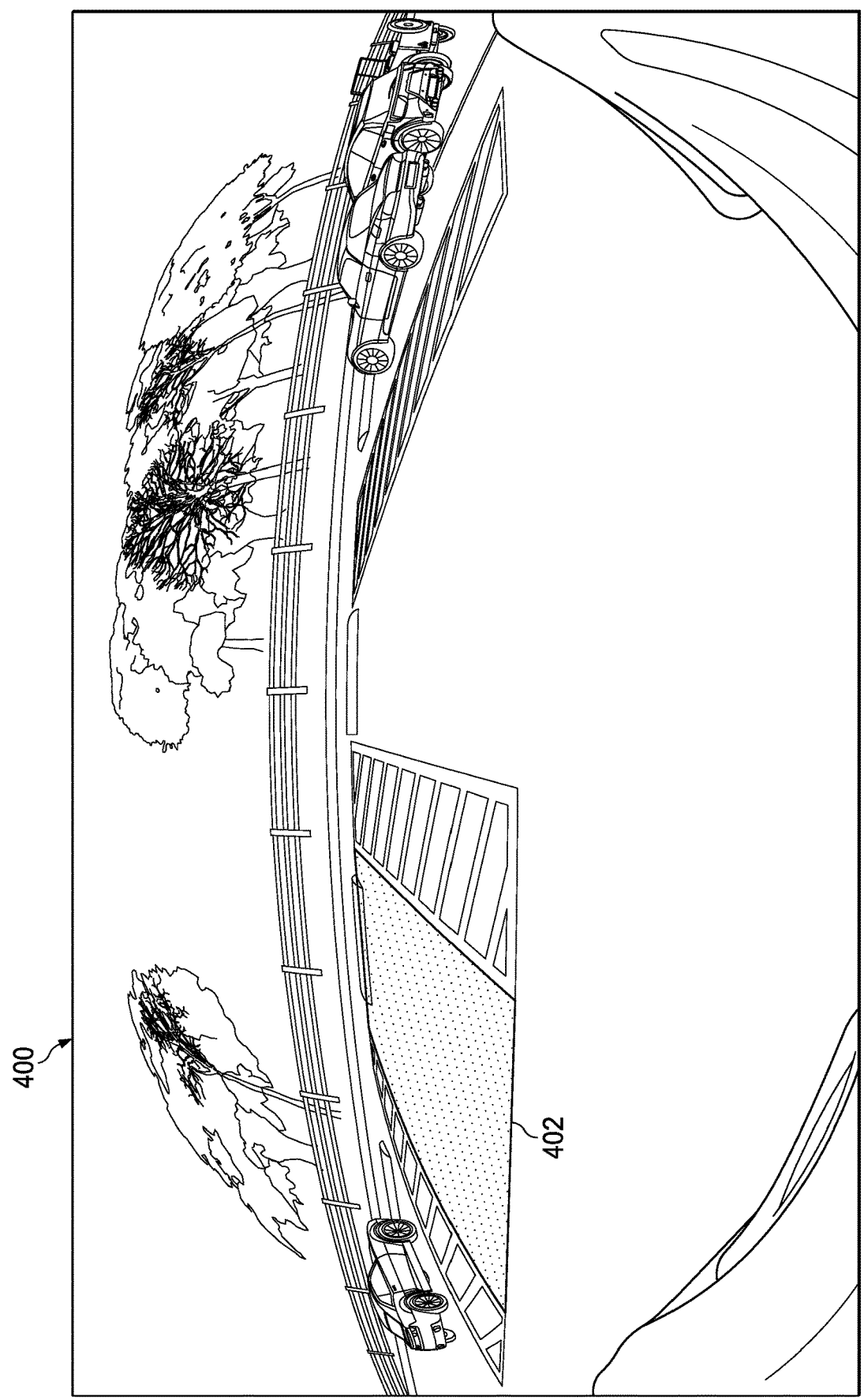
FIG. 4 illustrates a pixel mask, in accordance with aspects of the present disclosure.

A pixel wise mask may be generated based on the labeled image. For example, from the intermediate points 306 and four corner points 302A-302D of FIG. 3, a pixel wise mask 402, as shown in image 400 of FIG. 4, may be generated by considering the pixels within the lines 304 of FIG. 3 as being within a parking spot. That is, the lines may be considered as the outer border or boundary of the parking spot. In certain cases, the image may also be labeled with the generated pixel wise mask. Pixel wise masks may be useful, for example, for accurately identifying portions of irregularly shaped parking spots.

Generally, labelled images are used to train a ML object recognition system to properly detect a corresponding object during a training phase. For example, as indicated previously, ML object detection techniques, such as SSD or YOLO, can be used to detect parking spots. These techniques generally utilize pre-defined anchor boxes into which an object can be fitted. However, using anchor boxes with distorted images, such as those produced by a fisheye lens, tends to be difficult due to issues with mapping anchor boxes to the distorted images. For example, existing ML object detection techniques may use a predefined set of rectangular anchor box shapes. Images may be divided in a grid with multiple cells, and each cell analyzed by a set of detectors corresponding with a set of rectangular anchor box shapes to generate a confidence score for each possible rectangular anchor box shape. However, such rectangular shapes may not be compatible with distorted images. In accordance with certain aspects of the present disclosure, a ML object detection system may be trained to detect a parking spot based on corner points of the parking spot. For example, a ML parking spot detector may be trained based upon the labeled images as discussed above in conjunction with FIG. 2.

Figure 5:
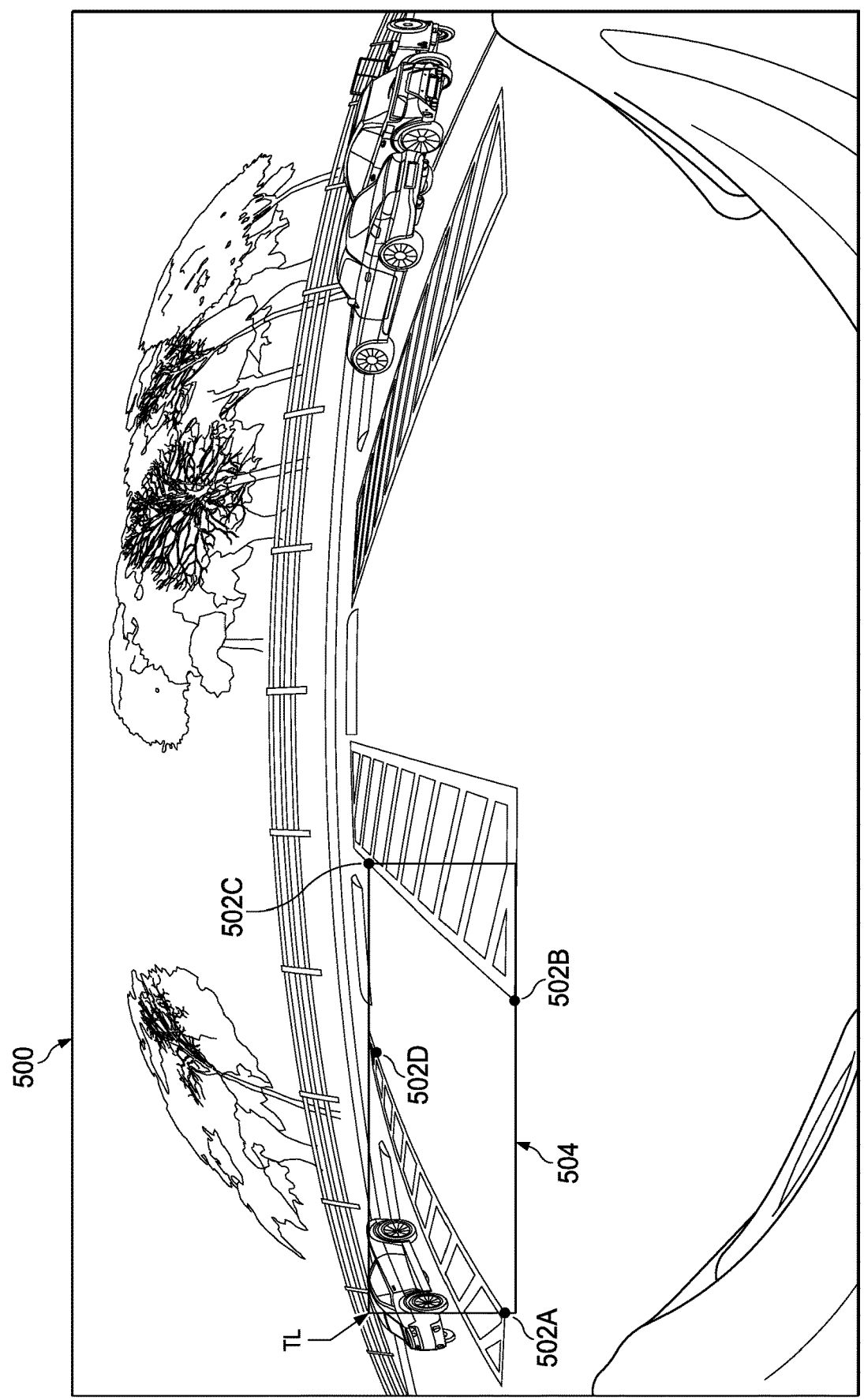
FIG. 5 is an image illustrating corner detection, in accordance with aspects of the present disclosure.

FIG. 5 is an image 500 illustrating corner detection, in accordance with aspects of the present disclosure. As shown in image 500, a ML parking spot detector may predict corner points 502A-502D for an image received from a fisheye lens. As an example, the ML parking spot detector may generate a confidence score for a set of anchor box shapes for corner points 502A-502D. The set of anchor box shapes may be filtered based on the generated confidence scores, for example, based on a threshold confidence score. The remaining anchor boxes may be compared to remove duplicates and overlapping anchor boxes to generate the prediction of the corner points 502A-502D. During training, these anchor box shapes may be compared against a ground truth virtual bounding box 504.

Training the ML parking spot detector may be performed based on the ground truth virtual bounding box 504. For example, a training image may be labelled with the ground truth locations of corner points 502A-502D for parking spots in the image. It may be understood that a training image may be labeled with corner points corresponding to multiple parking spots, but for clarity in this example, a single parking spot is shown. The ground truth virtual bounding box 504 is defined based on the corner points 502A-502D in the training image. The ground truth virtual bounding box 504 may be drawn around the corner points 502A-502D. The ground truth virtual bounding box 504 may be based on a minimum rectangle area having sides parallel to the image plane and containing the corner points 502A-502D in the sides of the ground truth virtual bounding box 504. The ground truth virtual bounding box 504 may be defined by x and y coordinates of the top-left (TL) corner of the ground truth virtual bounding box 504, along with a width (W) and height (H) of the ground truth virtual bounding box 504. A corresponding prediction vector for the corner points 502A-502D may be defined as [502A_x, 502A_y, 502B_x, 502B_y, 502C_x, 502C_y, 502D_x, 502D_y, TL_x, TL_y, W, H], where x and y are x and y coordinates. That is, 502A_x represents the x coordinates of corner point 502A, 502A_y represents the y coordinates of corner point 502A, and so forth for corner points 502B-503D, TL_x representing the x coordinate of the top-left corner of the ground truth virtual bounding box 504, and TL_y representing the y coordinate of the top-left corner of the ground truth virtual bounding box 504. In certain cases, TL_x, TL_y, W, H information may be used during training, for example, for matching anchor boxes, and this information may be omitted after the ML parking spot detector has been trained.

During training, the ML object detector, such as a corner point detector, may locate a corner point and generate confidence scores for a set of anchor box shapes for the located corner point. The anchor box shapes may be compared to the ground truth virtual bounding box 504 to determine which anchor box shapes correspond with the ground truth virtual bounding box 504. Correspondence may be based on how accurately a given anchor box overlaps with the ground truth virtual bounding box. In certain cases, an intersection over union (IOU) may be calculated. The IOU determines an amount of overlap between regions of a given anchor box and the ground truth virtual bounding box. The IOU may be determined by dividing the overlapping regions by the total regions of ground truth virtual bounding box. In certain cases, a list of anchor boxes with an IOU of more than a threshold, such as 0.5, may be determined as corresponding, and a loss criteria, or function, may be calculated for the corresponding anchor boxes. The corner points may be used to determine the loss criteria. In certain cases, the TL_x, TL_y, W, H information may be omitted for determining loss criteria. The loss criteria may be used to indicate to a ML object detector in training how accurately the ML object detector has detected a target object. The loss criteria may also be used to determine correction weights to be applied to various layers of the ML object detector for back propagation.

In certain cases, the loss criteria may be defined to prioritize estimating corner point locations over estimating the virtual bounding box parameters. For example, the loss criteria may be defined as $loss=\sum_{i=1}^{12} w_i *(Pv[i]-Gv[i])^2$, where the virtual box parameters are defined by $w_i=k1$, $\in i=[1, 4]$, the corner point parameters are defined by $w_i=k2$, $\in i=[5, 12]$, where $k1+k2=1$, Pv is the prediction vector, Gv is the ground truth vector based on the label, and $0<k1<k2<1$.

In accordance with aspects of the present disclosure, the detected corner points may be extended to produce a pixel wise detection. For example, in a manner similar to that discussed in conjunction with FIG. 3, once the four corner points have been identified, the four corner points may be converted to the corrected image domain and lines drawn linking the four corner points. After the lines are drawn, one or more intermediate points may be interpolated on these lines. The intermediate points may be placed at regular intervals along the lines and each line may include the same number of intermediate points. For example, two intermediate points may be placed, equally spaced on each line. The four corner points and intermediate points may then be converted back into the distorted image domain and the pixel wise mask may be generated by filling in the areas between the corner points and intermediate points and identifying these pixels as part of the parking spot.

In certain cases, when multiple parking spots are located close together, such as in a large parking lot, detected parking spots may overlap. Irregularly shaped pixel masks may be used to help avoid overlapping detection of multiple parking spots in a distorted image. For example, a pixel mask may be drawn based on the detected corner points for a first parking spot. A second pixel mask may be drawn based on detected corner points for a second parking spot. The first pixel mask may be compared to the second pixel mask using a pixel based free form intersection over union (IOU) comparison. Generally, an IOU comparison takes the two pixel masks and determines the overlapping regions of the two pixel masks and divides the overlapping regions by the combined regions of the two pixel masks and generating a resulting score. In certain cases, a lower resulting score may indicate a larger overlap between the first and second pixel masks. The resulting score may be compared to a threshold and scores below the threshold may be suppressed.

Figure 6:
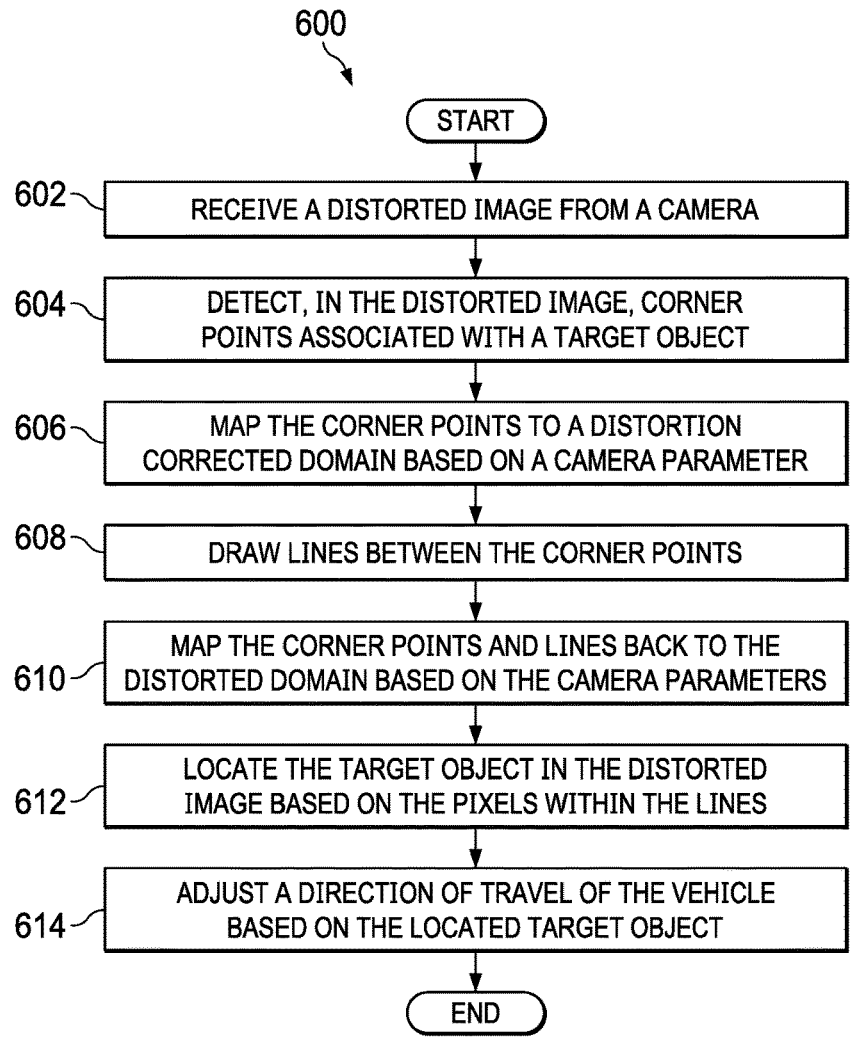
FIG. 6 is a flow chart illustrating a technique 600 for object detection in a distorted image, in accordance with aspects of the present disclosure.

FIG. 6 is a flow chart illustrating a technique 600 for object detection in a distorted image, in accordance with aspects of the present disclosure. As an example, the technique 600 may be performed by an autonomous or semi-autonomous vehicle to enable the vehicle to detect a parking space. At block 602, the technique begins by receiving a distorted image from a camera. For example, a distorted image may be received from a camera having a fisheye lens. At block 604, the method includes detecting, in the distorted image, corner points associated with a target object. For example, corner points, such as for the corners associated with a parking space, may be detected by a ML object detector. At block 606, the method includes mapping the corner points to a distortion corrected domain based on one or more camera parameters. For example, a location of the corner points may be mapped from a distorted image domain to a corrected image domain based on predefined camera parameters. The camera parameters may be a mapping between pixels locations in a given image domain to another image domain and may be used to correct for distortion caused by, for example, a camera and/or lens. The camera parameters, such as focal length, principal point, projection matrix, position of the camera center, etc., may be defined, for example, during a calibration routine and stored. At block 608, the method includes drawing lines between the corner points. As an example, the corner points may include the corners of a rectilinear area and lines may be drawn as between the corners, defining the rectilinear area. At block 610, the method includes mapping the corner points and lines back to the distorted image domain based on the camera parameters. As an example, mapping a limited number of points, such as corner points and lines, between image domains helps reduce the amount of computational resources needed as compared to converting an entire image. At block 612, the method includes locating the target object in the distorted image based on the pixels within the lines. For example, the lines may be considered as defining the outer edge of the parking space and pixels outside of this line may be considered as not a part of the parking space, while pixels within the line may be considered part of the parking space. The location of the parking space within the image may be determined based on the pixels within the line. At block 614, the method includes adjusting a direction of travel of the vehicle based on the located target object. For example, a map or mask indicating which pixels are associated with the parking spot may be used by a process for steering the vehicle into the parking spot.

Figure 7:
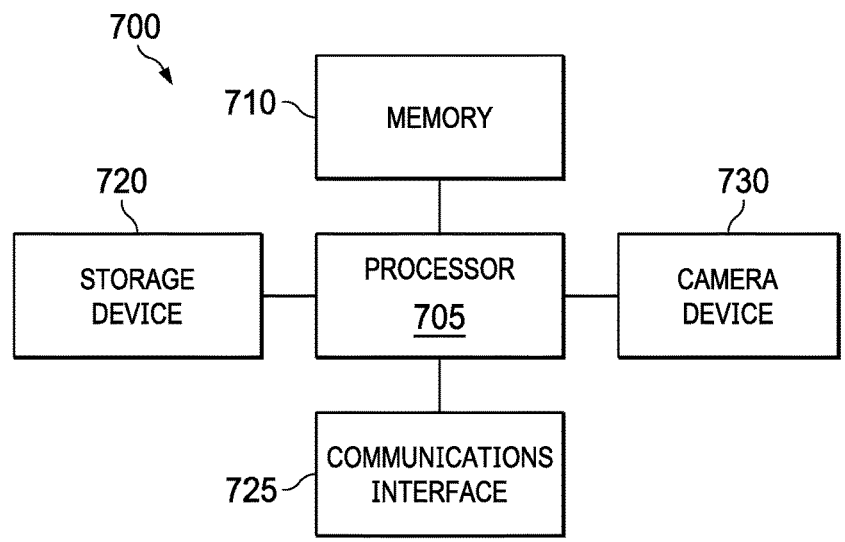
FIG. 7 is a block diagram of an embodiment of a computing device, in accordance with aspects of the present disclosure.

As illustrated in FIG. 7, the computing device 700 includes a processing element such as processor 705 that contains one or more hardware processors, where each hardware processor may have a single or multiple processor cores. Examples of processors include, but are not limited to, a central processing unit (CPU) or a microprocessor. Although not illustrated in FIG. 7, the processing elements that make up processor 705 may also include one or more other types of hardware processing components, such as graphics processing units (GPUs), application specific integrated circuits (ASICs), field-programmable gate arrays (FPGAs), and/or digital signal processors (DSPs). In certain cases, processor 705 may be configured to perform the tasks described in conjunction with FIG. 6. Generally, the computing device 700 may perform any of the functionality described above (e.g., in conjunction with FIGS. 2-6).

FIG. 7 illustrates that memory 710 may be operatively and communicatively coupled to processor 705. Memory 710 may be a non-transitory computer readable storage medium configured to store various types of data. For example, memory 710 may include one or more volatile devices such as random access memory (RAM). Non-volatile storage devices 720 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 720 may also be used to store programs that are loaded into the RAM when such programs executed.

Software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage 720, from memory 710, and/or embedded within processor 705 (e.g., via a cache or on-board read only memory (ROM)). Processor 705 may be configured to execute the stored instructions or process steps in order to perform instructions or process steps to transform the computing device into a non-generic, particular, specially programmed machine or apparatus. Stored data, e.g., data stored by a storage 720, may be accessed by processor 705 during the execution of computer executable instructions or process steps to instruct one or more components within the computing device 700. Storage 720 may be partitioned or split into multiple sections that may be accessed by different software programs. For example, storage 720 may include a section designated for specific purposes, such as storing program instructions or data for updating software of the computing device 700. In one embodiment, the software to be updated includes the ROM, or firmware, of the computing device. In certain cases, the computing device 700 may include multiple operating systems. For example, the computing device 700 may include a general-purpose operating system which is utilized for normal operations. The computing device 700 may also include another operating system, such as a bootloader, for performing specific tasks, such as upgrading and recovering the general-purpose operating system, and allowing access to the computing device 700 at a level generally not available through the general-purpose operating system. Both the general-purpose operating system and another operating system may have access to the section of storage 720 designated for specific purposes.

The one or more communications interfaces may include a radio communications interface for interfacing with one or more radio communications devices. In certain cases, elements coupled to the processor may be included on hardware shared with the processor. For example, the communications interfaces 725, storage, 720, and memory 710 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from a camera device 730, may be output from the computing device 700 via the communications interfaces 725 to one or more other devices. The camera device 730 includes one or more camera sensors and one or more lenses which may produce distorted images, such as fisheye or wide-angle lenses.

Figure 8:
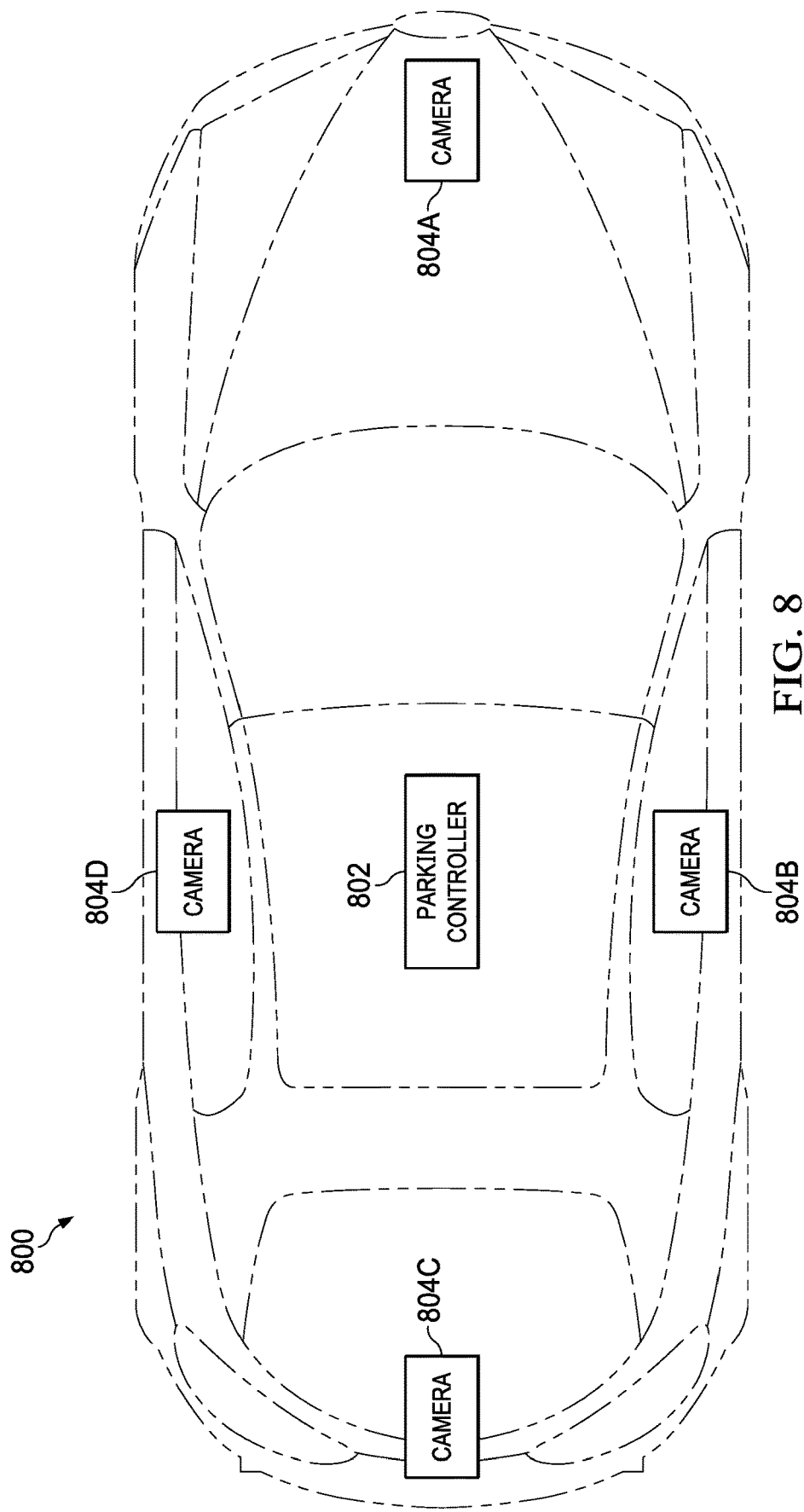
FIG. 8 is a block diagram of a vehicle capable of detecting a parking spot, in accordance with aspects of the present disclosure.

FIG. 8 is a block diagram of a vehicle 800 capable of detecting a parking spot, in accordance with aspects of the present disclosure. The vehicle 800 includes a parking controller 802 and one or more cameras 804A-804D disposed around the vehicle 800. The one or more cameras 804A-804D are electronically coupled to the parking controller 802 and capable of transmitting images to the parking controller 802. The one or more cameras 804A-804D may be coupled to the parking controller 802 over any vehicle network, such as a controller area network (CAN) bus, or wireless network. The one or more cameras 804A-804D may be similar to those discussed in conjunction with camera device 730 of FIG. 7. In this example, the one or more cameras 804A-804D are disposed around the periphery of the vehicle 800, but it may be understood that the one or more cameras 804A-804D may be located anywhere on the vehicle 800. The parking controller 802 may be similar to computing device 700 of FIG. 7 and include one or more processors, memory, storage device, and communications interface. In certain cases, the parking controller 802, may be integrated as a part of another chip or package, such as a SOC.

While a vehicle with an onboard driver has been described herein, other embodiments may be implemented in vehicle in which the "driver" is remote from the vehicle, such as autonomous vehicles that may be controlled from a remote site.

As use herein, the term "vehicle" may also be applied to other types of devices, such as robots, industrial devices, medical devices, etc. in which low cost, low power processing of images from multiple cameras to form a virtual viewpoint in real time is beneficial.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, universal serial bus (USB) key), via a transmission path from computer readable media on another digital system, etc.

What is claimed is:

1. A method comprising:
   receiving a distorted image from a camera disposed about a vehicle;
   detecting, in the distorted image, corner points associated with a rectilinear target object;
   mapping the corner points to a distortion corrected domain based on one or more camera parameters;
   interpolating one or more intermediate points to generate lines between the corner points in the distortion corrected domain;
   mapping the corner points and the lines between the corner points back to a distorted domain based on the camera parameters;
   locating the rectilinear target object in the distorted image based on pixels within the lines; and
   adjusting a direction of travel of the vehicle based on the located rectilinear target object.

2. The method of claim 1, further comprising:
   mapping the one or more intermediate points back to the distorted domain based on the camera parameters; and
   determining the pixels within the lines based on the corner points and intermediate points.

3. The method of claim 1, wherein the distorted image comprises a fisheye distorted image.

4. The method of claim 1, wherein the rectilinear target object comprises a parking spot.

5. The method of claim 1, further comprising:
   prior to receiving a distorted image from a camera, performing a training sequence comprising:
   detecting corner points of a rectilinear training object in a training image, the training image associated with ground truth locations of corner points for the rectilinear training object;
   determining a loss criteria between the detected corner points and the ground truth locations of corner points for the training image; and
   adjusting one or more weights associated with corner point detectors based on the loss criteria.

6. The method of claim 5, wherein the training sequence further comprises:
   drawing a virtual bounding box based on the detected corner points; and
   comparing the virtual bounding box with a ground truth virtual bounding box associated with the training image.

7. The method of claim 6, wherein the one or more weights are adjusted based on the loss criteria and the comparison between the virtual bounding box and the ground truth virtual bounding box and wherein the loss criteria is prioritized above a result of the comparison between the virtual bounding box with the ground truth virtual bounding box when adjusting the one or more weights associated with the corner point detectors.

8. The method of claim 7, wherein the comparing step is based on a pixel based intersection over union comparison.

9. A non-transitory program storage device comprising instructions stored thereon to cause one or more processors to:
   receive a distorted image;
   detect, in the distorted image, corner points associated with a rectilinear target object;
   map the corner points to a distortion corrected domain based on one or more camera parameters;
   interpolate one or more intermediate points to generate lines between the corner points in the distortion corrected domain;

map the corner points and lines between the corner points back to a distorted domain based on the camera parameters;

locate the rectilinear target object in the distorted image based on pixels within the lines; and output one or more instructions for adjusting a direction of travel based on the located rectilinear target object.

10. The non-transitory program storage device of claim 9, wherein the stored instructions further cause one or more processors to:

map the one or more intermediate points back to the distorted domain based on the camera parameters; and determine the pixels within the lines are further based on the corner points and intermediate points.

11. The non-transitory program storage device of claim 9, wherein the distorted image comprises a fisheye distorted image.

12. The non-transitory program storage device of claim 9, wherein the rectilinear target object comprises a parking spot.

13. The non-transitory program storage device of claim 9, wherein the stored instructions further cause one or more processors to, prior to receiving a distorted image, perform a training sequence comprising:

detecting corner points of a rectilinear training object in a training image, the training image associated with ground truth locations of corner points for the rectilinear training object;

determining a loss criteria between the detected corner points and ground truth locations of corner points for the training image; and adjusting one or more weights associated with corner point detectors based on the loss criteria.

14. The non-transitory program storage device of claim 13, wherein the training sequence further comprises:

drawing a virtual bounding box based on the detected corner points; and comparing the virtual bounding box with a ground truth virtual bounding box associated with the training image.

15. The non-transitory program storage device of claim 14, wherein the one or more weights are adjusted based on the loss criteria and the comparison between the virtual bounding box and the ground truth virtual bounding box and wherein the loss criteria is prioritized above a result of the comparison between the virtual bounding box with the ground truth virtual bounding box when adjusting the one or more weights associated with the corner point detectors.

16. A vehicle capable of detecting a parking spot, the vehicle comprising:

one or more cameras disposed about the vehicle;

a memory; and one or more processors operatively coupled to the memory, and the one or more cameras, wherein the one or more processors are configured to execute non-transitory instructions causing the one or more processors to:

receive a distorted image from the one or more cameras;

detect, in the distorted image, corner points associated with a rectilinear target object;

map the corner points to a distortion corrected domain based on one or more camera parameters;

interpolate one or more intermediate points to generate lines between the corner points in the distortion corrected domain;

map the corner points and lines between the corner points back to a distorted domain based on the camera parameters;

locate the rectilinear target object in the distorted image based on pixels within the lines; and adjust a direction of travel of the vehicle based on the located rectilinear target object.

17. The vehicle of claim 16, wherein the non-transitory instructions further cause one or more processors to:

map the one or more intermediate points back to the distorted domain based on the camera parameters; and determine the pixels within the lines are further based on the corner points and intermediate points.

18. The vehicle of claim 16, wherein the distorted image comprises a fisheye distorted image.

19. The vehicle of claim 16, wherein the rectilinear target object comprises a parking spot.

20. The vehicle of claim 16, wherein the non-transitory instructions further cause one or more processors to, prior to receiving a distorted image, perform a training sequence comprising:

detecting corner points of a rectilinear training object in a training image, the training image associated with ground truth locations of corner points for the rectilinear training object;

determining a loss criteria between the detected corner points and ground truth locations of corner points for the training image; and adjusting one or more weights associated with corner point detectors based on the loss criteria.

* * * * *